United States Patent [19]
Klement et al.

[11] 4,410,235
[45] Oct. 18, 1983

[54] DEVICE FOR PRODUCING A MOVING LIGHT BEAM

[75] Inventors: Ekkehard Klement; Gerhard Schiffner, both of Munich, Fed. Rep. of Germany

[73] Assignee: Siemens Aktiengesellschaft, Berlin & Munich, Fed. Rep. of Germany

[21] Appl. No.: 176,027

[22] Filed: Aug. 7, 1980

[30] Foreign Application Priority Data

Sep. 10, 1979 [DE] Fed. Rep. of Germany ....... 2936463

[51] Int. Cl.$^3$ .............................. G02B 5/14
[52] U.S. Cl. .................. 350/96.18; 350/6.3; 350/96.20
[58] Field of Search ........... 350/96.15, 96.18, 96.20, 350/96.29, 96.30, 6.2, 6.3, 96.13

[56] References Cited

U.S. PATENT DOCUMENTS

| 3,836,225 | 9/1974 | Wilde et al. | 350/6.2 |
| 4,212,513 | 7/1980 | Gravel | 350/96.15 |
| 4,220,396 | 9/1980 | Antell | 350/96.15 |
| 4,236,784 | 12/1980 | Palmer | 350/96.20 |
| 4,303,302 | 12/1981 | Ramsey et al. | 350/96.20 |
| 4,304,460 | 12/1981 | Tanaka et al. | 350/96.18 X |

FOREIGN PATENT DOCUMENTS

| 130370 | 3/1978 | German Democratic Rep. | 350/6.2 |
| 54-5753 | 1/1979 | Japan | 350/96.18 |
| 54-22849 | 2/1979 | Japan | 350/96.13 |

OTHER PUBLICATIONS

Ohmori et al., "Optical Fiber Switch Driven by PZT Bimorph", Appl. Optics, vol. 17, No. 22, Nov. 1978, pp. 3531–3532.

Primary Examiner—John D. Lee
Attorney, Agent, or Firm—Hill, Van Santen, Steadman & Simpson

[57] ABSTRACT

A device has a waveguide, such as monomode fiber, for receiving a light beam and retransmitting specific portions of the light in a reemitted beam, which reemitted beam can be moved in space. To move the reemitted beam, the device has an arrangement for moving an end portion of the light waveguide adjacent the outlet surface to change the direction of the reemitted beam. The waveguide, such as the cladded optical fiber, can be either provided with a mode stripper or is of a sufficient length so that cladding modes will be eliminated before reaching the outlet surface. To move the end of the waveguide, various arrangements, which can utilize either an electro-magnet, a piezoelectric device or other suitable movement devices, are utilized. The device usually includes outlet optics for the reemitted beam and these optics can either be a gradient lens secured on the outlet surface of the waveguide or a lens which is spaced a distance from the outlet surface.

21 Claims, 8 Drawing Figures

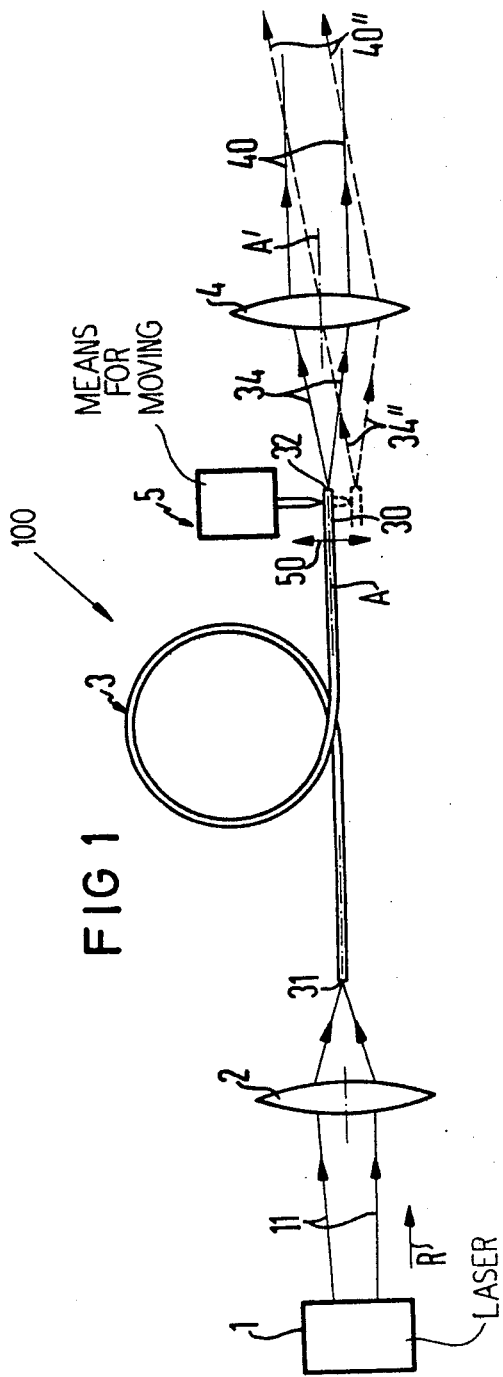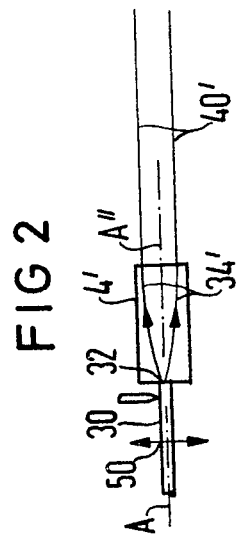

4,410,235

DEVICE FOR PRODUCING A MOVING LIGHT BEAM

BACKGROUND OF THE INVENTION

The present invention is directed to a device, which is arranged to receive a light beam and emit a specific portion as a beam which can be moved in space.

An example of the device of this kind is an oscillating reflector, which is arranged in the path of a light beam. The light, which hits the reflector surface, is reflected by the reflector in different directions. Due to the oscillatory movement, a change occurs in the inclination of the reflector relative to the axis of the incoming light beam, and a change will also occur in the direction of which the reflected light beam is transmitted. Therefore the transmitted beam will move in space according to the motion of the reflector.

SUMMARY OF THE INVENTION

The present invention is directed to providing a device for receiving a light beam and to emit a specific portion of the light beam as a reemitted beam which can be moved in space and to providing a device which is simple and cheap to produce. The device also does not require a moveable reflector to produce the motion in the reemitted beam.

The above features are accomplished in a device for receiving a light beam and transmitting specific portions which device comprises a light waveguide having an inlet surface at one end and an outlet surface at the opposite end, means for coupling a beam of light into the inlet surface, means for uncoupling the reemitted beam emerging from the outlet surface, and means for moving the end portion of the light waveguide adjacent the outlet surface to change the direction of the reemitted light beam.

On account of the extremely small mass of the moving end portion of the light waveguide in the present device, it is possible, for example, to achieve a high motion frequency. The device is also easy to handle and adjust and possesses a broad spectrum of uses. Since the light waveguide operates in a specific manner as a mode diaphragm, the path of the light beam in which the device is arranged can be of a low quality.

A particular advantageous embodiment of the device in accordance with the invention is achieved when the light waveguide is a monomode light waveguide. In a monomode light waveguide, fundamentally only one wave form for example, only one mode is capable of being propagated in the waveguide. Thus, only the one mode will emerge at the outlet surface. This transmitted light represents a bundle of beams in which the beams actually appear to originate from one single light point and which can be consequently referred to as an ideal bunch of beams. The embodiment in question thus exhibits the properties of an ideal point light source.

An expedient embodiment of the device in accordance with the present invention is when the light waveguide consists of a core, cladded glass fiber, where the core zone of the end surfaces of the fiber form the inlet and the outlet surfaces of the waveguide. The core cladded glass fibers have been in production for some time. They are elastic and exhibit a high alternating bending strength and particularly when they consist of quartz glass. In these glass fibers, the monomode properties are fundamentally achieved in that the core diameter is selected to be very small for example only a few $\mu m$.

However, core cladded glass fibers of this type also transmit casing or cladding modes, which however will die out after a specific length of travel. If these cladding modes reach the outlet surface and are emitted therefrom, they will impair the quality of the bunch of beams. Therefore, it is advantageous to select the length of the glass fiber so that the cladding mode will decay or die out prior to reaching the outlet surface.

In order to remove these cladding modes, it may also be desirable to provide a mode stripper for stripping the cladding modes from the waveguide prior to reaching the outlet surface. If desired, it is possible to combine both the mode stripper and the predetermined length of the waveguide to insure that the cladding modes are completely extinguished.

It is particularly desirable to provide outlet lens means or outlet optics for receiving the reemitted light beam which is being emitted from the outlet lens means or surface. These outlet optics can be used to produce either a convergent or a divergent beam of the emerging bunch of beams or to focus the emerging bunch into a parallel bunch of beams. As a rule, it is sufficient for the outlet optics to possess a positive focal length. When a divergent angle of the emerging bunch of beams is to be enlarged, it is only necessary to use the output coupling optics having a negative focal length.

An embodiment of the outlet optics can be a conventional lens or a conventional objective which is arranged in a stationary manner to receive the light emitted from the outlet surface. In another embodiment, the optics includes a gradient lens, which is applied on the end surface of the outlet end of the fiber to move therewith. In the manner of conventional lens, the gradient lens can be assigned gaussian characteristics, namely main planes, focal length, focal planes and optical axes. A gradient lens can be contrived to be such that one of its focal planes lies in the region of the lens. As a result an applied lens can also produce convergent bunches of beams or parallel beams depending upon its construction. Such features are not necessarily present in conventional lenses.

Expediently, a device in accordance with the present invention may also include inlet optics or inlet lens means to focus the light into the inlet surface of the waveguide. The provision of the inlet lens means or optics allow a better exploitation of the light path being supplied by the incoming light beam.

With regard to the means for moving the end portion, it can include a guide element, which receives the end of the waveguide adjacent to the outlet surface and is moveable back and forth along one direction. In an embodiment, the guide element is an end of a deflectable arm or bendable strip. The bendable strip or deflectable arm may be a flexible armature which is secured on a leg of a U-shaped electro-magnetic arrangement so that actuation of the electro-magnet will bend the armature carrying the waveguide from a rest position. In another embodiment, the bendable strip or arm comprises a bimorph strip of two different piezo-electric crystals on which different voltages can be applied to cause bending. The bendable strip or arm can also be a bimetallic strip, which will bend when subjected to an increased temperature. The bimorph strip and the bendable strip acting as an armature of electro-magnet are preferably used when an oscillatory motion is required and they will also operate in resonance. The use of a bimetallic strip, which will bend when subjected to a change in termperature, is used in those devices in which a relatively slow, controlled movement is required.

In another embodiment, the guide element, which carries the end adjacent the outlet surface of the waveguide, is secured to the ends of a pair of parallel extending deflectable arms or bendable strips whose other ends are mounted on a member. If the member is fixed, then the guide element can move between a series of parallel planes with a substantially parallelogram motion along one direction. If another pair or a second pair of bendable strips or deflectable arms are provided and engage the movable member at one end and are fixed in a fixed support of the other end, then the movable member can also move in a plane extending along the axis of the pair of strips. If the second pair of strips have axes lying in a plane that extends perpendicular to the axes of the first pair of strips, then the guide element with the outlet face can move in two coordinates of a plane which is perpendicular to both of these planes. Thus, the means for moving will form a coordinate generator for moving the outlet surface along two perpendicular coordinates.

The means for moving can also provide oscillatory motion. For example, the guide element is oscillated due to torsional movement of a support therefor.

BRIEF DESCRIPTION OF THE DRAWINGS

FIG. 1 is a schematic illustration of a device in accordance with the present invention;

FIG. 2 is a partial schematic view of an embodiment of the device of FIG. 1;

DESCRIPTION OF THE PREFERRED EMBODIMENTS

Figure 3:
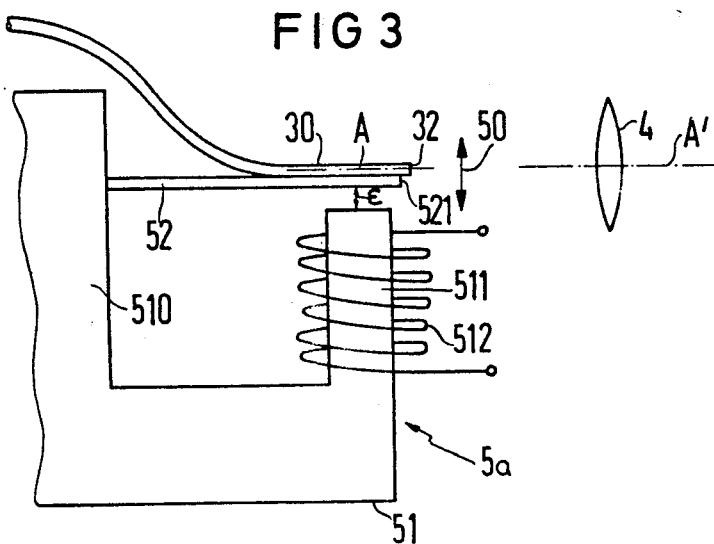
FIG. 3 is a partial side view of an embodiment of the movement mechanism in accordance with the present invention.

The principles of the present invention are particularly useful when incorporated into a device generally indicated at 100 in FIG. 1. The device 100 receives a light beam or a group of light beams 11 and transmits a portion of these light beams in a given direction 40 or 40", which direction can be moved.

The group of light beams 11 are projected in a direction of arrow R from a laser 1 and are received by means for coupling, which is illustrated as being a lens 2 which focuses the beam onto an inlet end surface 31 of a core cladded glass optical fiber 3, which forms a waveguide of the device. The focusing by the lens 2 is in such a manner that the light strikes the core zone of the fiber and is thus input coupled into the glass fiber. The diameter of the core of the glass optical fiber 3 is sufficiently small to allow the fiber to act as a monomode light waveguide which can only conduct one wave form. It should be noted that to be more precise, it should be said that the monomode light waveguide can conduct two wave forms namely one wave form of a specific polarization and the other wave form of a polarized state which is orthogonal thereto. However, these refinements will not be adopted in the present discussion since they have no significance with regard to the present invention. The core zone of the end surfaces 31, which simultaneously forms one end of the waveguides 3, thus forms an inlet surface via which the light can be input coupled into the waveguide 3.

The input coupled light is propagated in the fiber to the other end thereof, which is formed by an outlet surface 32 of the fiber. Here the light, which was carried in the core, is output coupled via the core zone of the end surface 32, which forms the outlet surface of the device.

On account of the extremely small diameter of the fiber core, and thus the small diameter of the outlet surface, there is emitted a bunch a light beams which actually appear to originate at a single light point or spot. The diameter of the light point or spot does not exceed the diameter of the output coupling surface and therefore amounts to a maximum of a few $\mu m$.

The length of the glass fiber is selected to be such that any cladding or casing modes which are being carried by the waveguide will die out or decay before they reach the outlet surface. Instead of utilizing the length of the glass fiber or in addition thereto, it is possible to provide a conventional mode stripper which will strip the cladding modes so that they are likewise unable to reach the output coupling position. A mode stripper of this kind can consist of a casing of a suitable index of refraction which surrounds the cladding of the fiber. Since the length of the fiber 3 is considerable in this case, it is expediently wound into a coil as illustrated in FIG. 1.

The bunch of light beams which emerge from the outlet end 32 of the fiber 3, are referenced 34 in FIG. 1 and can be deflected or shifted by a means for moving or a movement device generally indicated at 5 which serves to move an end portion 30 of the waveguide 3 which adjoins the outlet surface 32. The movement device 5 moves the end section 30 to and fro in a direction transverse to an axis A of the light waveguide at the end section 30 as indicated by the double headed arrow 50.

Optics or lens means are provided as illustrated by outlet lens 4, whose optical axis A' is arrnaged in the beam path of the emerging bunch of beams 34. In the exemplary embodiments shown in FIG. 1, it is assumed that when the end portion 30 assumes an undeflected rest position, its axis A is coaxial with the axis A' of the lens 4 and that the outlet surface 32 of the waveguide 3 lies in the focal plane of the outlet lens 4. Under this assumption, the bunch of diverging beams 34 are converted by the outlet lens 4 into an extremely sharp focused bunch of parallel beams 40 which, as illustrated are substantially parallel to the axis A'. If the outlet surface 32 is arranged at a greater distance from the outlet lens 4 than the focal plane, the lens will transform the divergent bunch of beams 34 into a more or less convergent bunch of beams. If on the other hand the outlet surface 32 is arranged between the outlet lens 4 and the forementioned focal plane, the outlet lens 4 will convert the divergent bunch of beams into a divergent bunch of beams which, however, possesses a smaller divergent angle. If the emerging bunch of beams 34 is to be converted into a bunch of beams which possesses a larger divergent angle, the outlet lens 4 must consist of a negative lens, i.e., a lens which has a negative focal length.

When the end portion 30 is deflected or displaced from its rest position, to the position illustrated in broken lines, which position is assumed to have the end portion 30 being still substantially parallel to the axis A and the outlet surface 32 to still lie in the aforementioned focal plane of the outlet lens 4, the bunch of light beams 34″, which are indicated in broken lines, will merge from the outlet surface 32 of the deflected end portion 30. These beams 34″ are converted by the outlet lens 4 into extremely sharply focused bunch of parallel beams 40″ which are illustrated in broken lines. Due to the displacement, the bunch of parallel beams 40″ will be inclined relative to the bunch of parallel beams 40 and to the axis A′. The above change of the angle of the parallel beams relative to the axis A′ will also occur with the divergent or convergent bunch of beams which will be at an angle to the axis A′ when the end 30 has been deflected or displaced from a rest position.

In the embodiment illustrated in FIG. 1, the outlet lens 4 is expediently supported to be stationary. Thus the end portion 30 is moved relative to the axis A′.

An embodiment of the device is illustrated in FIG. 2 in which a gradient lens 4′ is permanently connected to an end portion 30 of the waveguide 3 by being directly applied to the end surface or the outlet surface 32. If the end portion 30 is moved, the gradient lens 4′ is likewise moved. The gradient lens is commercially available and can be obtained for example under the trademark Selfoc ® lenses which have the form of small cylinders, whose diameters are not much greater than that of the light conducting fiber and which have a length of a few millimeters. In FIG. 2, it is assumed that the focal plane of the gradient lens coincides with one of its end surfaces so that the bunch of light beams which emerge from the end portion 30 are converted into a bunch of beams 34′ in which the beams are curved and emerge perpendicularly to the other end surface of the gradient lens 4′ as a bunch of beams 40′ on an axis A″ which is the optical axis of the gradient lens. While the above described and illustrated beams emerge as the parallel beams 40′, it is also possible to either arrange the lens relative to the end face or construct the lens so that either convergent beams or divergent beams are produced.

A first embodiment of the movement device or means 5 for moving an end portion 30 of the light waveguide 3 is generally indicated at 5a in FIG. 3. In this embodiment a leaf spring 52 has one end clamped on one side of a leg or arm 510 of a U-shaped component 51 with the other end 521 extending across the other leg 511. The component 51 is of a magnetizable material and has a coil 512 surrounding a leg 511. As illustrated, the leaf spring 52, which is of a magnetizable material, has the free end 521 being arranged a distance ϵ from the free end of the leg 511. If the coil 512 is energized, the leaf spring 52 is moved toward or away from the leg 511 depending upon the particular direction of the magnetic flux being created. The end portion 30 of the waveguide 3 is attached to the end portion of the spring 52 with the outlet surface 32 being adjacent the free end 521. Thus, the end portion 30 of the light waveguide 3 will move together with the forementioned end portion of the spring 52. In FIG. 3, the axis A of the end portion 30 of the waveguide 3 is directed to extend along the longitudinal length of the spring 52. When the electro-magnet formed by the coil 512 on the component 51 becomes excited, the axis A changes its direction. For example, it will become inclined at an angle to the axis A′ of the lens 4. If this change in the direction is undesirable, it is expedient to apply the end portion 30 in such a manner that the axis A is at right angles to the length of the spring 52 so that when the portion 30 moves the axis A will be displaced but remain parallel to the rest position of the axis. In such an arrangement, the portion 30 would be arranged at a right angle to its illustrated position and with the axis A extending perpendicular to the plane of the figure.

Figure 4:
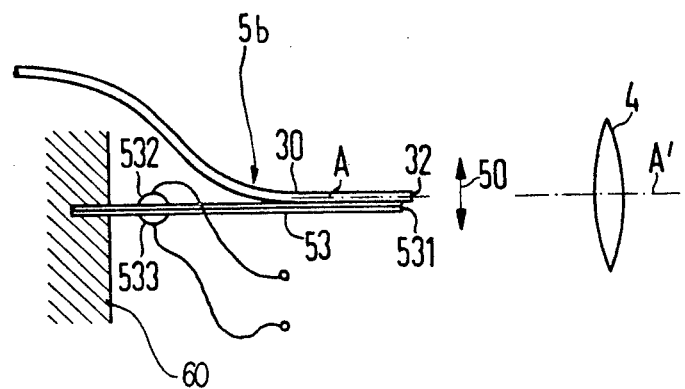
FIG. 4 is a partial side view of another embodiment of a movement mechanism in accordance with the present invention.

A second embodiment of the movement of means for moving is generally indicated at 5b in FIG. 4. This embodiment is similar to that of the embodiment 5a except that no electro-magnet is required for its operation. In this embodiment, a bimorph strip 53 has one end clamped in a stationary member 60 and has a free end 531. The end portion 30 of the light waveguide 3 is attached to the strip 53 adjacent the free end 531 with the outlet surface 32 extending thereover. The bimorph strip 53 consists of a double layer of piezo-electric material which layers have a different orientation. The strip is provided with contacts 532 and 533 with one of the contacts engaging one of the double layers and the other engaging the other layer. When a voltage difference is applied between the contacts, one layer of the bimorph strip will be stretched while the other will be contracted and the permanent connection between the two layers causes the bimorph strip 53 to bend or become curved. In this way, the end portion 30 will move in a manner similar to the end portion 30 in the device 5a of FIG. 3.

The embodiments 5a and 5b of the means for moving are particularly suitable for oscillatory motion. They are also suitable to guide the transmitted light beam instead of oscillating the beams. In that case, however, it is expedient to provide a suitable attenuation means for the means for moving. An example of such a means for attenuating is by submerging the device in a suitable liquid so that the device is operated while in the attenuating liquid.

A slow, oscillation free motion can also be produced by means of a heatable bimetallic strip which can be used in either of the embodiments 5a or 5b of FIG. 3 or FIG. 4. It is expedient to electrically heat the bimetallic strip by transmitting current therethrough so that the heated strip will assume a curved or bent configuration. When a bimetallic strip is constructed with a magnetizable material, it can be used in the embodiment 5a illustrated in FIG. 3 and can be operated either by heating or by the actuation of the electro-magnet.

In each of the above mentioned embodiments, the bendable strip or deflectable arm such as the magnetic strip 52 and the bimorph strip 53 are guide elements which are moveable in the direction of the double arrow 50. Thus, in these embodiments the guide element is integrated with the bendable strip or arm.

Figure 5:
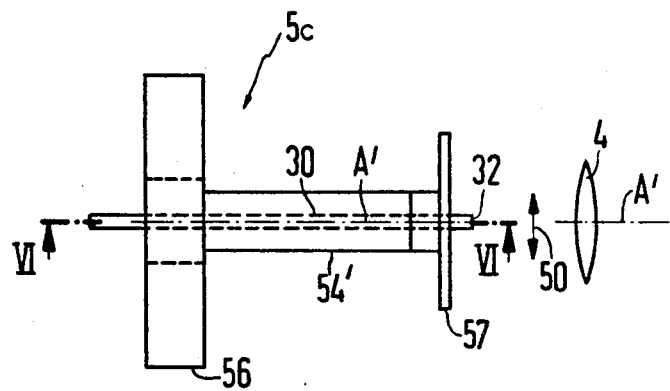
FIG. 5 is a partial side view of a third embodiment of a movement mechanism of the present invention.
Figure 6:
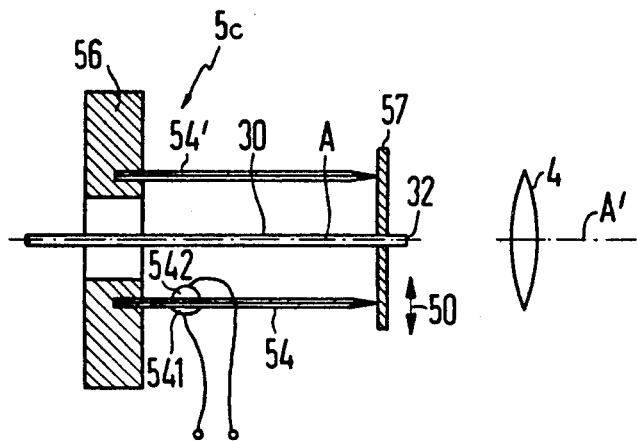
FIG. 6 is a cross-sectional view taken along the lines VI—VI of FIG. 5.

A third embodiment of the means for moving is generally indicated at 5c in FIGS. 5 and 6. In this embodiment, two parallel bendable strips 54 and 54′ have one end each clamped in a holder 56. The free ends are hinged to a connecting element 57, which connecting element acts as a guide element for the end portion 30 which is secured thereto. The two parallel strips 54 and 54′ are arranged beside one another in such a way that their wide surfaces extend parallel to each other. In order to operate the device 5c of FIGS. 5 and 6, it is necessary to cause only one of the two strips such as 54 to bend. While all of the above mentioned operating possibilities can be used for the purpose, as illustrated in FIG. 6, the strip 54 consists for example of a bimorph strip with the two layers being provided with the contacts 541 and 542. For expediency, the two strips 54 and 54' are of the same type.

In the operation of this device, due to the construction, the connecting element 57 will be guided to move substantially in a parallelogram type manner or movement. Thus, the element 57 will always lie in a plane parallel to the plane of the element 57 while in the illustrated rest position and the outlet surface 32 will be shifted along the direction of the double arrow 50.

Figure 7:
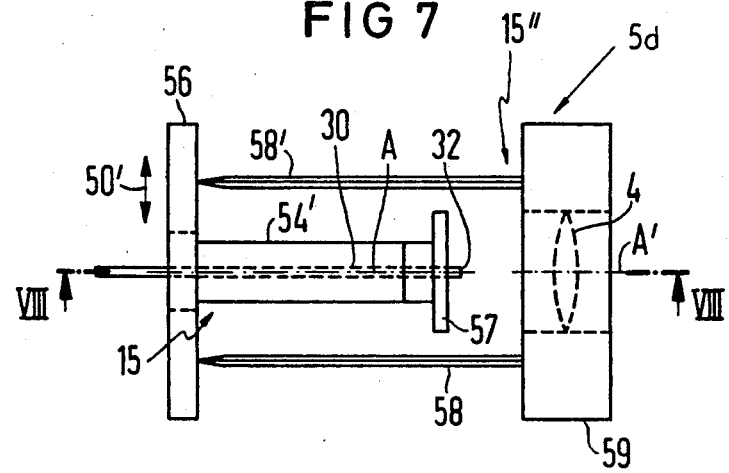
FIG. 7 is a partial side view of a fourth embodiment of a movement mechanism of the present invention.
Figure 8:
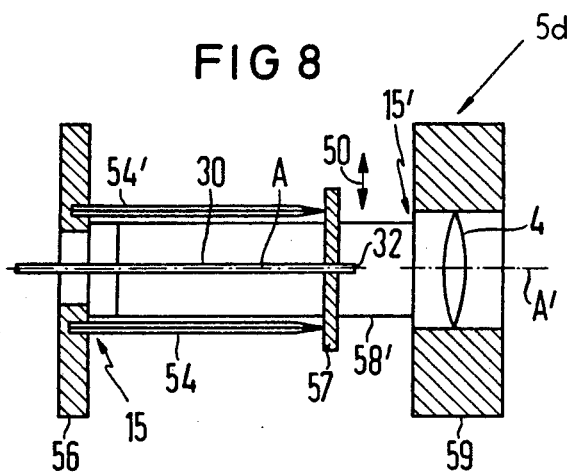
FIG. 8 is a cross-sectional view taken along the lines VIII—VIII of FIG. 7.

A further embodiment is generally indicated in FIGS. 7 and 8 as an embodiment 5d which provides a Cardanic suspension for the end portion 30 of the waveguide 3. To facilitate a movement of the end portion 30 independently in two directions, a first guide arrangement 15, which is the embodiments 5c of FIGS. 5 and 6 is provided and consists of a first pair of bendable strips 54 and 54' which are anchored in a member or support 56 at one end and have the other ends hinged to the guide plate or element 57. In the embodiment 5d, a second guide arrangement 15' includes a second pair of strips 58 and 58' which have one end mounted in a holder or structural member 59 for the lens 4 and the free ends of the strips 58 and 58' are hingedly connected to the member 56 so that it forms a parallelogram movement device or arrangement with the member 56 being moved to maintain substantially in a plane parallel to the plane of the illustrated rest position. As in the previous embodiments, the two strips 58 and 58' are arranged with their wide surfaces being substantially parallel and the parallel planes of these elements 58 and 58' extend at right angles to the parallel planes of the elements 54 and 54' so that the member 56 will move in a direction of the double arrow 50' which is at right angles to the double arrow 50 for the guide element 57.

In the embodiment 5d illustrated in FIGS. 7 and 8, the strips 54 and 54' with the connecting element 57 and the end portion 30 of the waveguide 3 are arranged between the strips 58 and 58'. The free end of the strips 54 and 54' and the outlet surface 32 of the waveguide 3 faces towards the holder 59. In order to operate the device, it is sufficient to operate only one of the two strips 58 and 58'. The additional guide arrangements 15' can be operated in the same manner as earlier embodiments 5a, 5b, or 5c.

The embodiments 5d can be operated either with or without attenuation. Thus, the end surface 32 can move in a plane substantially perpendicular to both the planes formed by the strips 58 and 58' and to the plane formed by the strips 54 and 54'. It is also noted that due to the movement in two coordinate directions, the two guide arrangements 15 and 15' form a coordinate generator moving the outlet surface 32 substantially in a single plane.

Other types of movement devices 5 are possible. For example, the movement device may utilize a torsion oscillator which coacts with a guide element which is either part of the oscillator or connected thereto. The guide element will consist for example of a disc to which the end portion 30 of the light waveguide is permanently connected. In addition to the above described coordinate generator, other coordinate generators can be used as the moving means 5.

In all of the described movement devices, it is possible to provide a gradient lens 4' in place of the lens 4. The gradient lens 4' and the conventional lens 4 can also be used in combination if desired.

In comparison with acoustic deflectors, the device in accordance with the present invention has the advantage that large deflecting angles can be achieved. In contrast to the deflectors provided with oscillating reflectors, generally speaking the oscillating masses of the present invention can be kept extremely small.

Although various minor modifications may be suggested by those versed in the art, it should be understood that we wish to embody within the scope of the patent granted hereon, all such modifications as reasonably and properly come within the scope of our contribution to the art.

We claim:

1. A device for receiving a light beam and retransmitting specific portions of the light beam in a reemitted beam which can be moved in space, said device comprising a light waveguide having an inlet surface at one end and an outlet surface at the opposite end, means for coupling a beam of light into the inlet surface, means for uncoupling the reemitted beam emerging from the outlet surface and means for moving the end portion of the light waveguide adjacent the outlet surface to change the direction of the reemitted light beam, said means for moving including a guide element being connected to the end portion of the light waveguide adjacent the outlet surface, and means enabling the guide element to be moved back and forth in at least one direction including a pair of parallel extending flexible arms having one end mounted on a member and the other ends connected to the guide element so that the guide element moves in the manner of a parallelogram.

2. A device according to claim 1, wherein the light waveguide is a monomode light waveguide.

3. A device according to claim 1, wherein the light waveguide consists of a core, cladded glass fiber, said core having ends providing the inlet surface and the outlet surface for the waveguide.

4. A device according to claim 3, which includes a mode stripper for stripping cladding modes from the light waveguide prior to reaching the outlet surface.

5. A device according to claim 3, wherein the length of the glass fiber is selected to be such that cladding modes will decay before reaching the outlet surface.

6. A device according to claim 1, wherein the means for uncoupling light exiting the outlet surface includes providing outlet lens means arranged in the path of the reemitted beam.

7. A device according to claim 6, wherein the outlet lens means is formed by a lens which is spaced a distance from the outlet surface, said outlet surface being moved transverse to an optical axis of the lens.

8. A device according to claim 6, wherein the outlet lens means is formed by a gradient lens, said gradient lens being applied on the outlet surface of the light waveguide and permanently connected thereto so that the gradient lens moves with the end portion of the light waveguide.

9. A device according to claim 1, wherein the means for coupling light into an inlet surface of a light waveguide includes inlet lens means being positioned to focus the beam of light onto the inlet surface of the light waveguide.

10. A device according to claim 1, wherein at least one of the flexible arms comprises a bimorph strip and the means for moving includes means for applying a voltage difference thereto.

11. A device according to claim 1, wherein at least one of the flexible arms is a heatable bimetallic strip so that application of heat to said strip causes bending thereof.

12. A device according to claim 1, wherein the means for moving includes a coordinate generator for moving said guide element so that the outlet surface of the waveguide moves in a plane extending substantially perpendicular to the axis of the waveguide.

13. A device according to claim 1, wherein said member is mounted for movement relative to a fixed device by a second pair of flexible arms so that movement of the first pair of flexible arms moves the guide element back and forth in one direction relative to said member and movement of the second pair moves said member in another direction.

14. A device according to claim 1, wherein the member is part of an electromagnet housing, and at least one of the flexible arms being composed of a magnetizable spring, said electromagnet having a coil so that energizing of said electromagnet causes said flexible arm to move as an armature for the magnet.

15. A device for receiving a light beam and retransmitting specific portions of the light beam in a reemitted beam which can be moved in space, said device comprising a light waveguide having an inlet surface at one end and an outlet surface at the opposite end, means for coupling a beam of light into the inlet surface, means for uncoupling the re-emitted beam emerging from the outlet surface and means for moving the end portion of the light waveguide adjacent the outlet surface to change the direction of the re-emitted light beam, said means for uncoupliing being a gradient lens, said gradient lens being permanently connected to the outlet surface of the light waveguide so that the gradient lens moves with the end portion of the light waveguide.

16. A device according to claim 15, wherein the means for moving includes a guide element having the end portion of the light waveguide connected thereto, and means enabling the guide element to be moved back and forth in at least one direction.

17. A device according to claim 16, wherein the guide element is an end of a flexible arm with the other end of said arm being mounted so that the one end is moveable relative to the mounted other end.

18. A device according to claim 16, wherein the means for moving include at least one flexible arm having one end connected to said guide element and the other end mounted in a member.

19. A device according to claim 18, which includes a pair of parallel extending flexible arms connected to the guide element at one end and being connected to said member at the other end so that the guide element moves in the manner of a parallelogram.

20. A device according to claim 16, wherein said means for moving includes a first pair of flexible arms having their ends connected to said guide element, the other end being mounted in a moveable member, a second pair of flexible arms having one end attached in a fixed support and the other end attached to said moveable member, the direction of movement of said second pair being perpendicular to the direction of movement of said first pair so that the end surface of the waveguide is moveable in two coordinates of a plane extending substantially perpendicular to the axis of the waveguide.

21. A device for receiving a light beam and retransmitting specific portions of the light beam in a reemitted beam which can be moved in space, said device comprising a light waveguide having an inlet surface at one end and an outlet surface at the opposite end, means for coupling a beam of light into the inlet surface, means for uncoupling the reemitted beam emerging from the outlet surface and means for moving the end portion of the light waveguide adjacent the outlet surface to change the direction of the reemitted light beam, said means for moving including a guide element being connected to the end portion of the light waveguide adjacent said outlet surface, and means enabling the guide element to be moved back and forth in at least one direction including a torsion oscillator supporting said guide element.

* * * * *